US009186574B2

(12) United States Patent
Riggles

(10) Patent No.: US 9,186,574 B2
(45) Date of Patent: Nov. 17, 2015

(54) AMUSEMENT MACHINE INCLUDING A CRANE GAME IN COMBINATION WITH A WIN EVERY TIME GAME AND A GAME OF CHANCE

(75) Inventor: Brian Keith Riggles, St. Louis, MO (US)

(73) Assignee: S&B Entertainment Inc., St. Louis, MO (US)

( * ) Notice: Subject to any disclaimer, the term of this patent is extended or adjusted under 35 U.S.C. 154(b) by 812 days.

(21) Appl. No.: 13/411,525

(22) Filed: Mar. 3, 2012

(65) Prior Publication Data

US 2012/0228828 A1    Sep. 13, 2012

Related U.S. Application Data

(60) Provisional application No. 61/449,030, filed on Mar. 3, 2011, provisional application No. 61/474,347, filed on Apr. 12, 2011, provisional application No. 61/502,190, filed on Jun. 28, 2011.

(51) Int. Cl.
| | |
|---|---|
| *A63F 9/24* | (2006.01) |
| *A63F 9/30* | (2006.01) |
| *G07F 17/32* | (2006.01) |
| *G07F 17/34* | (2006.01) |
| *G06Q 30/02* | (2012.01) |

(52) U.S. Cl.
CPC ............. *A63F 9/30* (2013.01); *G06Q 30/0209* (2013.01); *G07F 17/3251* (2013.01); *G07F 17/3253* (2013.01); *G07F 17/3255* (2013.01); *G07F 17/3297* (2013.01); *G07F 17/34* (2013.01)

(58) Field of Classification Search
USPC ....... 273/138.1, 142 R, 142 H, 440, 447, 448, 273/454, 459, 460
See application file for complete search history.

(56) References Cited

U.S. PATENT DOCUMENTS

| | | | | |
|---|---|---|---|---|
| 5,711,530 | A * | 1/1998 | Lewis | 273/448 |
| 6,050,895 | A * | 4/2000 | Luciano et al. | 463/7 |
| 6,152,447 | A * | 11/2000 | Stanley | 273/138.1 |
| 6,267,669 | B1 * | 7/2001 | Luciano et al. | 463/7 |
| 7,614,951 | B2 * | 11/2009 | Flemming et al. | 463/20 |
| 2003/0011133 | A1 * | 1/2003 | Uedono et al. | 273/447 |
| 2006/0255544 | A1 * | 11/2006 | Halliburton | 273/447 |
| 2007/0114725 | A1 * | 5/2007 | Peck et al. | 273/447 |
| 2009/0191931 | A1 * | 7/2009 | Peck | 463/7 |

\* cited by examiner

*Primary Examiner* — Nini Legesse

(74) *Attorney, Agent, or Firm* — White-Welker & Welker, LLC; Matthew T. Welker, Esq.

(57) ABSTRACT

Coin operated amusement device including a crane game, a game of chance, and a simulated slot machine in combination. A player deposits coins, and is able to play three games. One game is a traditional crane game. A second game requires a player to press a button to stop moving, flashing lights on an area to win a prize. The second game is located on the corners of the cabinet and above the marquee on the top of the crane game machine cabinet. In a third game, the player plays a slot machine game located on the marquee of the crane machine and pulls a one-arm bandit handle to start the game. If the player wins the slot machine game, the prize is tickets that can be redeemed via an online website/store. Games are played in any order and combination and the prizes adjusted by the operator.

16 Claims, 6 Drawing Sheets

AMUSEMENT MACHINE INCLUDING A CRANE GAME IN COMBINATION WITH A WIN EVERY TIME GAME AND A GAME OF CHANCE

CROSS REFERENCE TO RELATED APPLICATIONS

This application claims priority from U.S. Provisional Patent Application Ser. No. 61/449,030, entitled "AMUSEMENT MACHINE INCLUDING A CRANE GAME IN COMBINATION WITH A WIN EVERY TIME GAME AND A GAME OF CHANCE", filed on 3 Mar. 2011. The aforementioned application is hereby incorporated herein by reference.

This application claims priority from U.S. Provisional Patent Application Ser. No. 61/474,347, entitled "AMUSEMENT MACHINE INCLUDING A CRANE GAME IN COMBINATION WITH A WIN EVERY TIME GAME AND A GAME OF CHANCE", filed on 12 Apr. 2011. The aforementioned application is hereby incorporated herein by reference.

This application claims priority from U.S. Provisional Patent Application Ser. No. 61/502,190, entitled "AMUSEMENT MACHINE INCLUDING A CRANE GAME IN COMBINATION WITH A WIN EVERY TIME GAME AND A GAME OF CHANCE", filed on 28 Jun. 2011. The aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to an amusement machine. More specifically, the present invention relates to an amusement machine in which a player activates a crane in a housing or cabinet in an attempt to pick up a prize from a selection of prizes and carry it to an outlet and then participates in a game of chance.

BACKGROUND OF THE INVENTION

A claw crane (also called a variety of other names) is a type of arcade game known as a merchandiser, commonly found in video arcades, supermarkets, restaurants, movie theaters, and bowling alleys. A claw crane may also be referred to as a teddy picker, candy crane, claw machine, crane vending machine, arcade claw, grab machine, crane game or simply the claw.

A claw crane consists of many parts, but the basic components are a PCB, power supply, currency detector, credit/timer display, joystick, wiring harness, bridge assembly, and claw. The claw will have two or more prongs or arms, although most claws will usually have three.

The cabinet is usually constructed of medium-density fiberboard (MDF), plywood or other wood or plastic materials. Some cabinets are made of aluminum alloy or other metals such as 18 gauge steel, which makes it easier to relocate as well as cheaper to produce. The window at the front of the machine is normally made of glass or a cheaper-to-manufacture substitute, such as acrylic. The marquee is a branded graphic sometimes created specifically for restaurants or an operator's business name behind the front.

A claw vending machine consists of prizes, usually plush toys or alternatives such as jewelry, capsulated toys, hats, balls, dolls, shirts, candy and electronics. Higher end and more expensive prizes are sometimes placed in a plastic bag so the toy is harder to pick up. The player places coins into the machine, which then allows the player to manipulate a joystick that controls the claw for a variable time (controlled by the operator) usually 15 to 30 seconds (in some cases, a claw vending machine might offer a minute of time). The player is able to move the claw back, forth and sideways, although some machines allow the player to move the claw after it has partially descended.

At the end of the play time (or earlier if the player presses a trigger button on the joystick), the claw descends down and makes an attempt to grip. After making the gripping attempt, the claw then moves over an opening in the corner of the case and releases its contents. If the player is successful, then the prize the claw is holding is dropped into the opening and dispensed through a chute into a hatch for collection.

An alternative version of the machine, popular in arcades, is the two-button version: one marked with a forward arrow, one with a right arrow. The crane starts near the front, left side of the machine and the player presses first the forward button to move the crane towards the back of the cabinet. Once the button is released the crane stops moving and the button cannot be used again, thus requiring the player to judge depth accurately in one attempt. After this, the right button becomes active in a similar way and as soon as it is released, the crane drops to a certain depth and then raises, closing its claw on the way and returning to the drop hatch in the front left corner. These versions are generally considered to be more difficult. However, the button type machines typically do not feature the timers, which are commonly found on joystick type machines.

The success rate winning a prize is dependent on several factors, including operator settings, player skill, depth perception, type of machine, and prizes available (size, density, and distribution). A prize may be lost due to player inexperience, player error in manipulating the claw, or the specific crane configuration. Many modern cranes use a computer to determine a payout percentage based on the operators settings, in the manner that the claw would have a strong grasp on objects only on a certain percentage of attempts. All modern claw machines incorporate some means for the owner to adjust at least the strength of the claw's grip and how closely the claw's fingers pull together, usually with screws on the mechanism or potentiometers on the PCB. Even on older machines, the grip strength can be adjusted by adding circuit components or additional hardware. Some machines incorporate a feature called two-level claw power, which, when enabled, causes the claw to at first grip at full strength, but then weaken its grip to the normal level after a brief delay. This can cause the crane to initially pick up the prize, but then drop it. Modern, higher-end claw machines are fully computerized and are remotely programmable by the owner (via a hand-held device).

SUMMARY OF THE INVENTION

The present invention is a coin operated amusement device that is comprised of a crane game, a win every time game, and a simulated slot machine in combination. When a player deposits their coins, they are able to play three games. One game is a traditional crane game. A second game requires a player to press a button to stop moving, flashing lights on an area to win a prize. The second game is located on the corners of the cabinet and above the marquee on the top of the crane game machine cabinet. Finally, in a third game, the player plays a slot machine game located on the marquee of the crane machine component of the device. If the player wins the slot machine game, the prize is tickets that can be redeemed via an online website/store.

The games may be played in any order or combination, the prizes may be adjust as desired by the operator. The game play of each game may also be adjusted by the operator to control winning percentages and payouts.

BRIEF DESCRIPTION OF THE DRAWINGS

The accompanying drawings, which are incorporated herein an form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
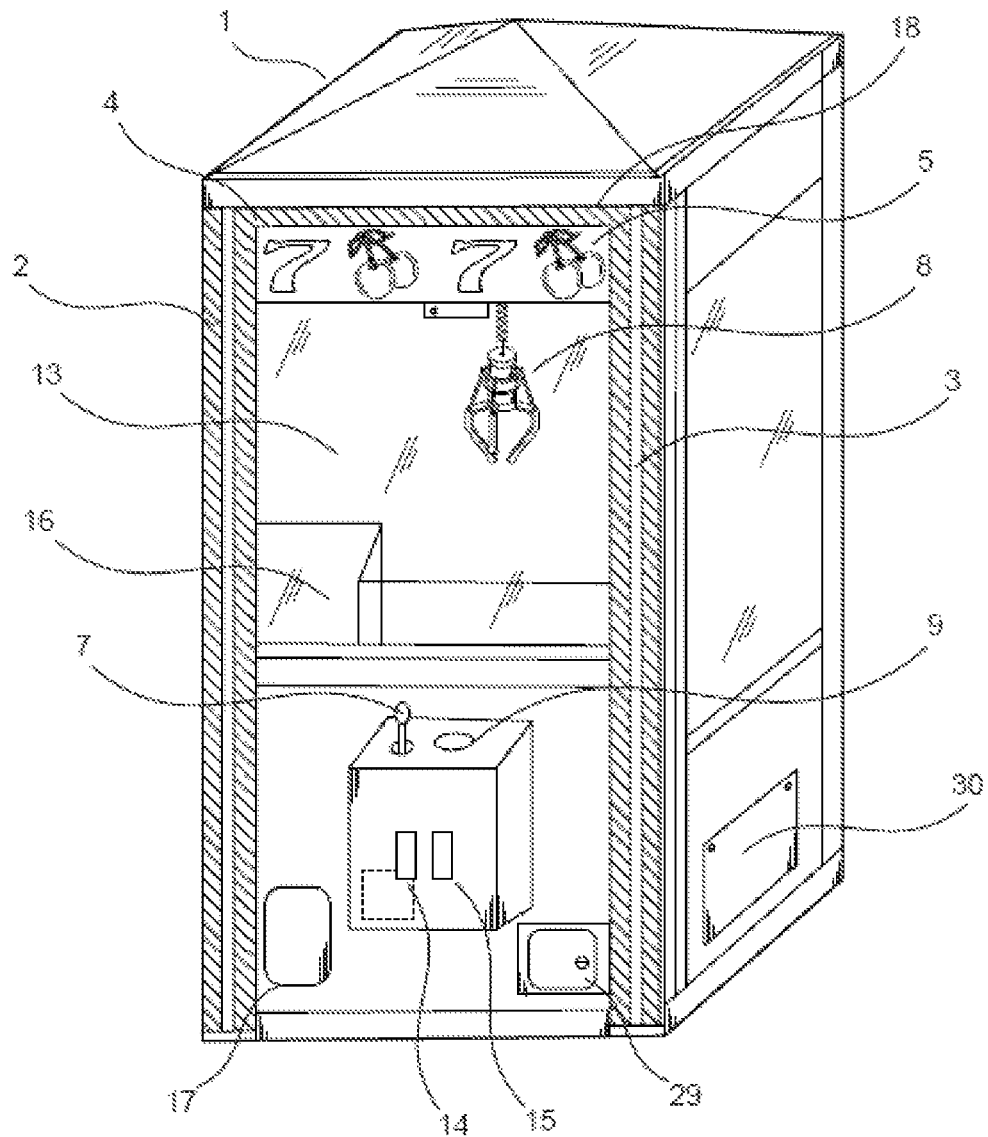
FIG. 1 is a perspective view of an amusement machine illustrating the crane machine and the marquee of the crane machine cabinet containing the games of chance and win every time games according to the present invention.

Now referring to the Figures, the present invention is a coin operated amusement device that is comprised of a crane game, a game of chance, and a simulated slot machine in combination as shown in FIG. 1. When a player deposits their coins, they are able to play three games. One game is a traditional crane game. A second game requires a player to press a button to stop moving, flashing lights on an area to win a prize. The second game is located on the corners 2 and 3 of the cabinet 1 and above the marquee 5 on the top 4 of the crane game machine cabinet 1 as shown in FIG. 1. In the second game, the player may or may not be guaranteed to win a prize and the prizes may be products, tickets, award a price, additional crane free plays, or moving on to or access the third game for playing.

Finally, in a third game, the player plays a slot machine game located on the marquee 5 of the crane machine cabinet 1 of the device as shown in FIG. 1. If the player wins the slot machine game, the prize may be products or tickets that can be redeemed via an online website/store or even additional crane free plays.

Figure 2:
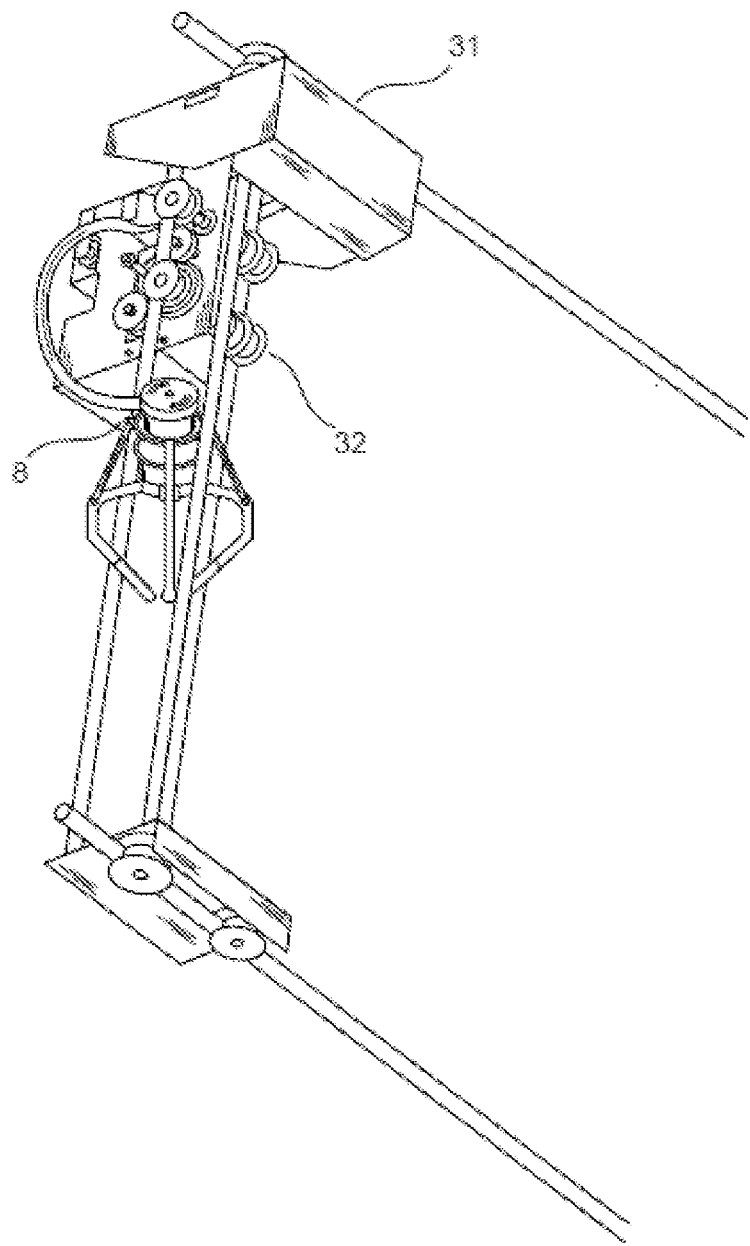
FIG. 2 is a perspective view of the crane apparatus according to the present invention.
Figure 3:
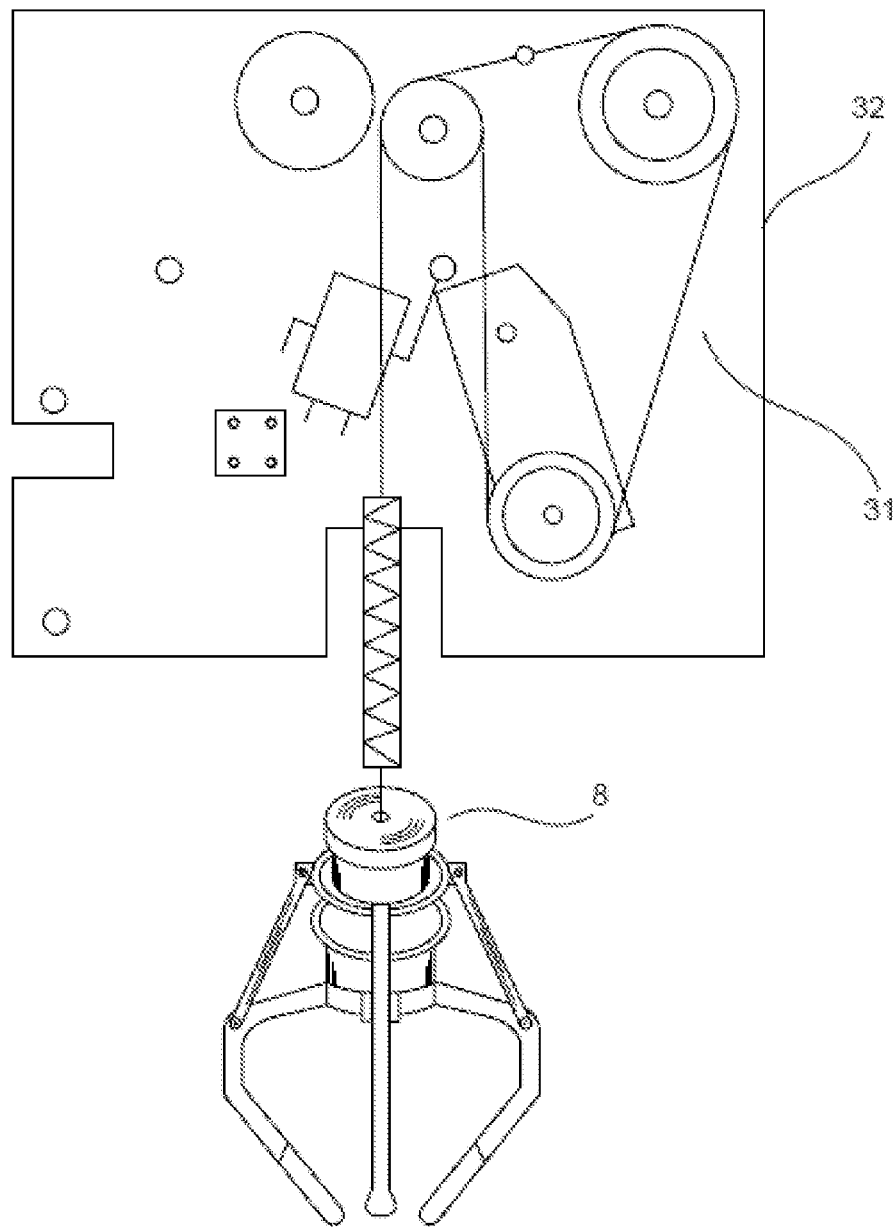
FIG. 3 is a perspective view of the crane apparatus according to the present invention.
Figure 4:
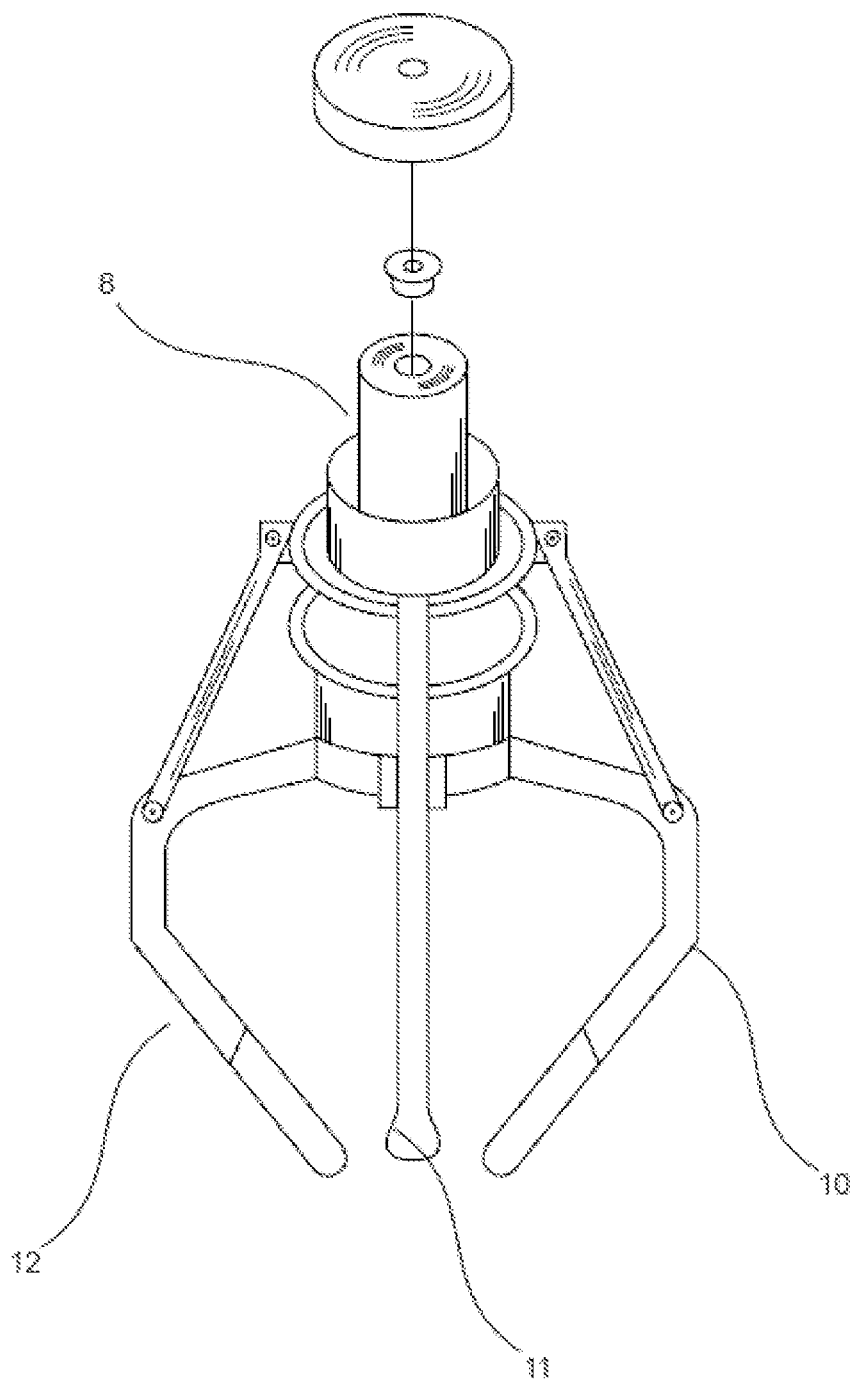
FIG. 4 is a perspective view of the crane claw apparatus according to the present invention.
Figure 5:
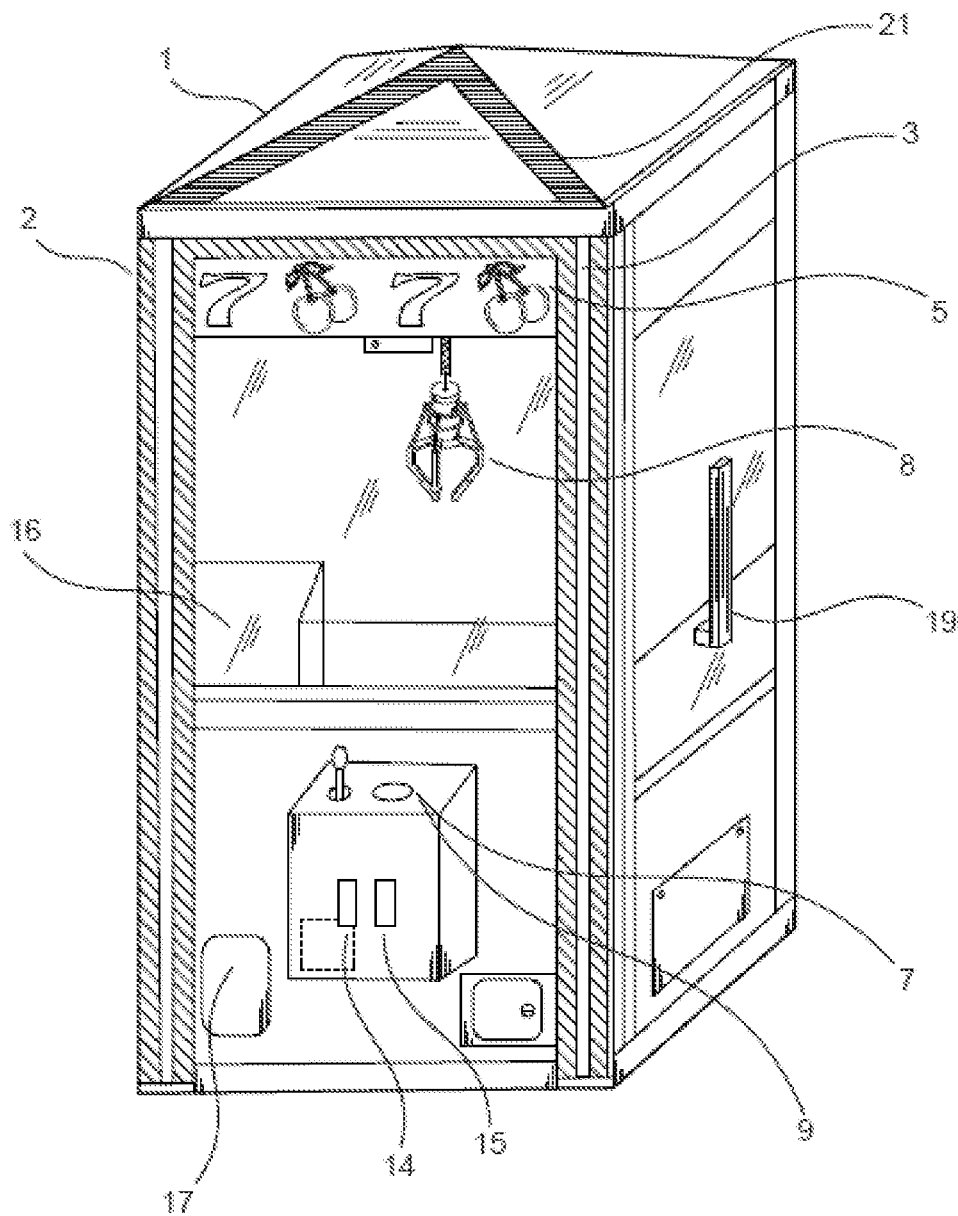
FIG. 5 is a perspective view of the crane apparatus according to an alternative embodiment of the present invention featuring a one arm bandit or slot machine handle.
Figure 6:
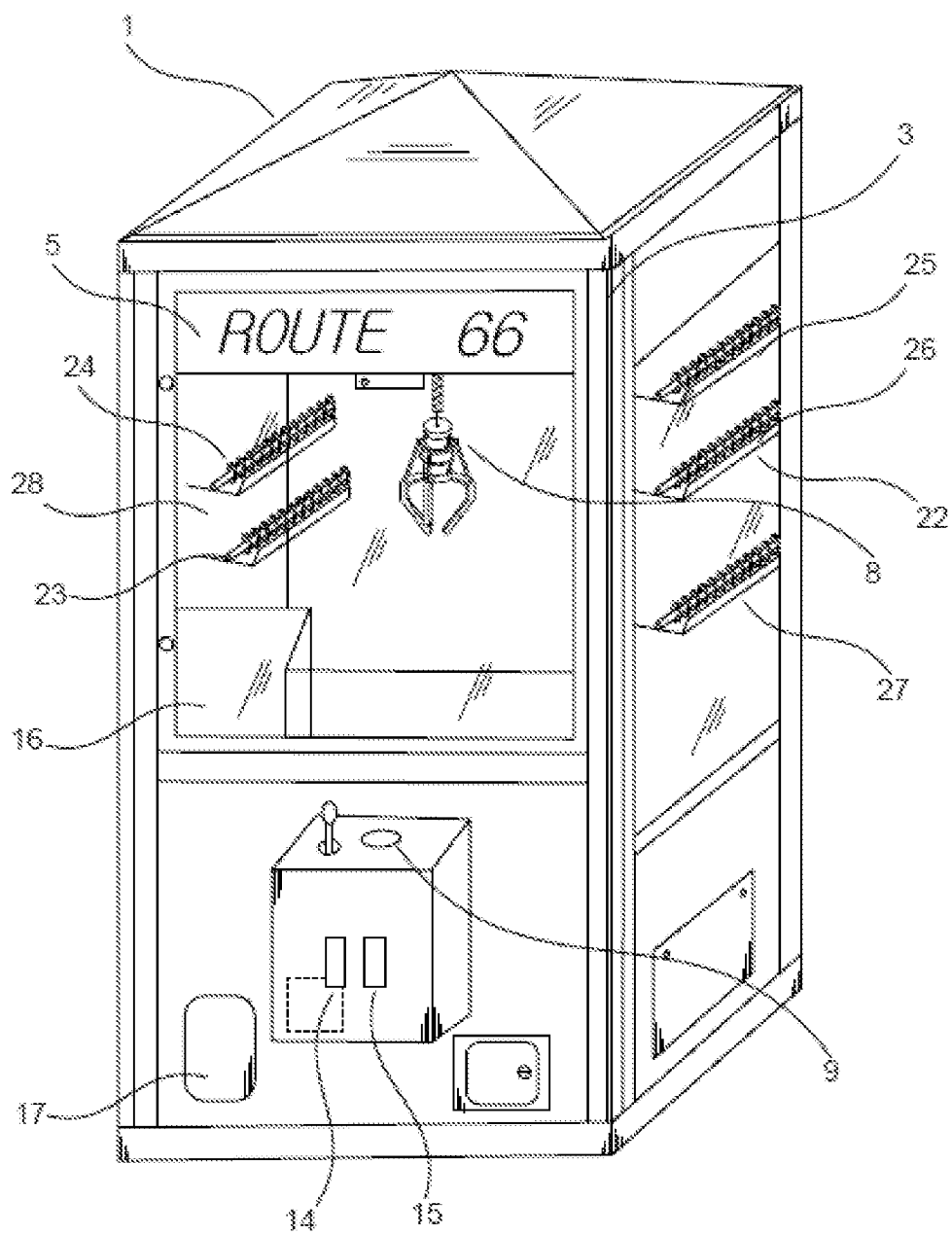
FIG. 6 is a perspective view of the crane apparatus according to an alternative embodiment of the present invention featuring a second change price crane and hanging price win feature.

The basic components of the claw game are a cabinet 1 as shown in FIG. 1, a crane mechanism 31 mounted inside the cabinet 1, and motorized means 32 for maneuvering the crane to pick up prizes as shown in FIGS. 2-3 and discharge them through an outlet or prize door 17, a PCB, power supply accessed through a board access panel 30, currency detector, credit/timer display, joystick 7, wiring harness, bridge assembly, button 9, claw 8, and coin door 29 for retrieving deposited money or coins by the operator. Not all components are shown or illustrated in the drawings as they are well known in the art and not necessary for one of ordinary skill in the art to make or use the present invention. Drawings of these elements are necessary for the understanding of the subject matter to be patented. As shown in FIG. 4, the claw 8 will have two or more prongs or arms 10, 11, 12, although most claws 8 will usually have three prongs or arms 10, 11, 12 as shown in the Figures.

The cabinet 1, as shown in the Figures is usually constructed of medium-density fiberboard (MDF), aluminum alloy, plastic or any other wood, metal or composite material. The window 13 at the front of the machine is made of glass or acrylic. The marquee 5 is a branded graphic created specifically for the crane game, game of chance, and slot machine game and is located behind or on the front panel window 13 of the cabinet 1.

The player places coins into the machine's coil slots 14 and 15, which then allows the player to manipulate a joystick 7 or one or more buttons 9 that controls the claw 8 for a variable time, controlled by the operator. The player is able to move the claw 8 back, forth and sideways. At the end of the play time or earlier if the player presses a trigger button 9, the claw 8 descends or drops down and makes an attempt to grip. After making the gripping attempt, the claw 8 then moves over an opening 16 in the corner of the case and releases its contents as shown in FIGS. 1-4. If the player is successful, then the prize the claw 8 is holding is dropped into the opening 16 and dispensed through a chute into a hatch for collection 17. In a conventional crane machine game, the player will have an allotted period of play time before the crane becomes inoperable. In a win ever time crane game, the player can continue to maneuver the claw 8 until a prize is detected in the dispensing chute opening 16 by detection means.

Upon ending play on the first game, the player starts play on a second game, which is a game of chance. The second game requires a player to press a button 9 to stop moving, flashing lights 18 on an area to win a prize. The second game is located on the corners of the cabinet 2 and 3 and above the marquee 5 on the top of the crane game machine cabinet 4 as shown in FIGS. 1 and 3. In the second game, the player may or may not be guaranteed to win a prize. The player presses a button 9 to stop the moving, flashing lights 18, and, if won, a prize is dispensed based on the location on the corners of the cabinet 2 and 3 above the marquee 5 on the top of the crane game machine cabinet 4 where the moving, flashing lights 18 were stopped when the player pressed the button 9.

The moving, flashing lights 18 on the corners of the cabinet 2 and 3 above the marquee 5 on the top of the crane game machine cabinet 4 may move in a complete circle or may move away in from each other from a shared starting point in two or more lines starting at a shared location in a path of any shape until they meet. At the meeting point the lights 18 will start moving back on the same path traveled to the shared starting point. The player will have a goal of stopping the lights 18 on a given location on the corners of the cabinet 2 and 3 above the marquee 5 on the top of the crane game machine cabinet 4 or area on the marquee 5 as they move. If the player stops the lights 18 in the correct location or area a prize will be awarded. If the player wins the game, the prize may be products or tickets that can be redeemed via an online website/store or even additional crane free plays.

Upon ending play on the second game, the player starts play on a third and final game. In the third game, the player plays a slot machine game or other similar game of chance also located on the marquee 5 of the crane machine as shown in FIGS. 1 and 3. The player presses a button 9, and a slot machine game is started and played. A prize is dispensed based on the results of the slot machine display and the payout system advertised and in place on the machine. If the player wins the slot machine game, the prize may be products or tickets that can be redeemed via an online website/store or even additional crane free plays.

The games may be played in any order or in any combination or order of game play. The prizes and payout may also be adjusted as desired by the operator. The game play of each game may also be adjusted by the operator to control winning percentages and payouts.

In alternative embodiment, the crane machine may be win every time or traditional crane machines or replaced with any arcade machine or possibly a juke box in any combination with one or more of the games of chance described above.

FIG. 2 is a perspective view of the crane apparatus according to yet another alternative embodiment of the present invention featuring a one arm bandit or slot machine handle 19. In this alternative embodiment, a one arm bandit or slot machine handle 19 is located on one external surface 20 of the cabinet 1 to start a game of chance. In this alternative embodiment, the game of chance is a replicated slot machine. This alternative embodiment combines the traditional crane machine game with a jackpot feature that replicates a slot machine. In this alternative embodiment, a user would first play the traditional crane game, then they would play a win every time game which would consists of a user pressing a button 9 to stop moving, flashing lights 18 located on the corners of the cabinet 2 and 3 and above the marquee 5 on the top 4 of the crane game machine cabinet 1 to win a prize; and finally, a user would have the opportunity to play a third, game of chance which replicates a slot machine and requires the user to pull the one arm bandit handle 19 located on an exterior surface 20 of the crane cabinet 1.

Now referring to FIG. 3, yet another alternative embodiment of the crane machine is shown where the traditional crane machine and cabinet 1 is additionally comprised of running lights 21 and a hanging prize win feature where prizes are hung from one or more hangers 22 in one or more locations 23, 24, 25, 26, and 27 on the inside surface 28 of the crane machine cabinet 1. Stopping the running lights 21 on a win position by pressing a button 9 allows the corresponding hanger location 23, 24, 25, 26, and 27 on the inside surface 28 of the crane machine cabinet 1 to dispense a prize. The prize is dispensed through an outlet or collection hatch 17 to the player. The traditional crane control joystick 7 and button 9 operates the claw 8 just as in other embodiments of the invention.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An amusement machine comprising a cabinet containing:
   an apparatus for playing a crane game;
      the apparatus comprising a cabinet, a crane mechanism mounted inside the cabinet, and motorized means for maneuvering the crane to pick up prizes and discharge them through an outlet; and
   an apparatus for playing a win every time game;
      the apparatus comprising a button to stop moving, flashing lights located on the corners of the cabinet and above a marquee on the top of the crane game machine cabinet to win a prize.

2. The machine of claim 1, further comprising
   an apparatus for playing a game of chance;
   the game of chance located on the marquee of the cabinet; and
      the button starts the game of chance located on the marquee of the cabinet to win a prize.

3. The machine of claim 2, wherein the game of chance is a simulated slot machine.

4. The machine of claim 3, further comprising a slot machine handle on one external surface of the cabinet to start a game of chance, which is a simulated slot machine.

5. The machine of claim 2, wherein
   the crane machine cabinet is additionally comprised of running lights and a hanging prize win feature where prizes are hung from one or more hangers in one or more location on an inside surface of the crane machine cabinet;
   the running lights are stopped on a win position by pressing a button that allows the corresponding hanger location on the inside surface of the crane machine cabinet to dispense a prize;
   the prize is dispensed through an outlet or collection hatch; and
   a crane control joystick and button operate the claw.

6. The machine of claim 1, wherein the prizes may be products, tickets, award a price, additional crane free plays, or moving on to or access a third game for playing.

7. The machine of claim 1, wherein in the win every time game, the player can continue to maneuver the claw until a prize is detected in the dispensing chute opening by detection means.

8. A method for providing an amusement machine including a crane game in combination with a win every time game and a game of chance comprising the steps of:

providing a crane machine cabinet with an apparatus for playing a crane game, and an apparatus for playing a win every time game;

playing a first game, which is a crane game;

ending play on the first game;

starting play on a second game, which is a game of chance;

requiring a player to press a button to stop moving, flashing lights on an area to win a prize;

the second game is located on the corners of the cabinet and above a marquee on a top of the crane game machine cabinet;

the moving, flashing lights are located on the corners of the cabinet and above the marquee on the top of the crane game machine cabinet;

the player will have a goal of stopping the lights on a given location on the corners of the cabinet or the marquee as they move;

if the player stops the lights in a correct location or area a prize will be awarded; and if the player wins the game, the prize may be products or tickets that can be redeemed or even additional crane free plays.

9. The method of claim 8, further comprising the step of guaranteeing a prize win for the second game, the game of chance.

10. The method of claim 8, wherein the moving, flashing lights on the corners of the cabinet and above the marquee on the top of the crane game machine cabinet move in a complete circle.

11. The method of claim 8, wherein the moving, flashing lights on the corners of the cabinet and above the marquee on the top of the crane game machine cabinet move away from each other from a shared starting point in two or more lines starting at a shared location in a path of any shape until they meet at a meeting point the lights will start moving back on the same line traveled to the shared starting point;

providing a goal of stopping the lights on a winning prize location on the corners of the cabinet and above the marquee on the top of the crane game machine cabinet or area on the marquee as they move; and stopping the lights in the winning prize location results in a prize being awarded.

12. The method of claim 8, further comprising the steps of starting play on a third and final game upon ending play of the second game;

playing a slot machine game or other similar game of chance, in a third game, also located on the marquee of the crane machine;

pressing the button and a slot machine game is started and played; and dispensing a prize based on a result of the slot machine display and a payout system advertised and in place on the machine.

13. The method of claim 8, wherein the games may be played in any order or in any combination or order of game play.

14. The method of claim 8, wherein the crane machine is either a win every time or play crane machine; or an arcade machine in any combination with the second or third games.

15. The method of claim 8, further comprising the step of providing a slot machine handle located on one external surface of the cabinet to start, the third game.

16. The method of claim 8, wherein the crane machine cabinet is additionally comprised of running lights and a hanging prize win feature where prizes are hung from one or more hangers in one or more locations on an inside surface of the crane machine cabinet;

stopping the running lights on a win position by pressing a button allows a corresponding hanger location on the inside surface of the crane machine cabinet to dispense a prize;

dispensing the prize through an outlet or collection hatch; and a crane control joystick and button operate the claw.

* * * * *